Feb. 9, 1965 W. R. CALVERT 3,168,806
APPARATUS FOR IMPROVING THE PURIFICATION OF EXHAUST
GASES FROM AN INTERNAL COMBUSTION ENGINE
Filed May 3, 1962 2 Sheets-Sheet 2
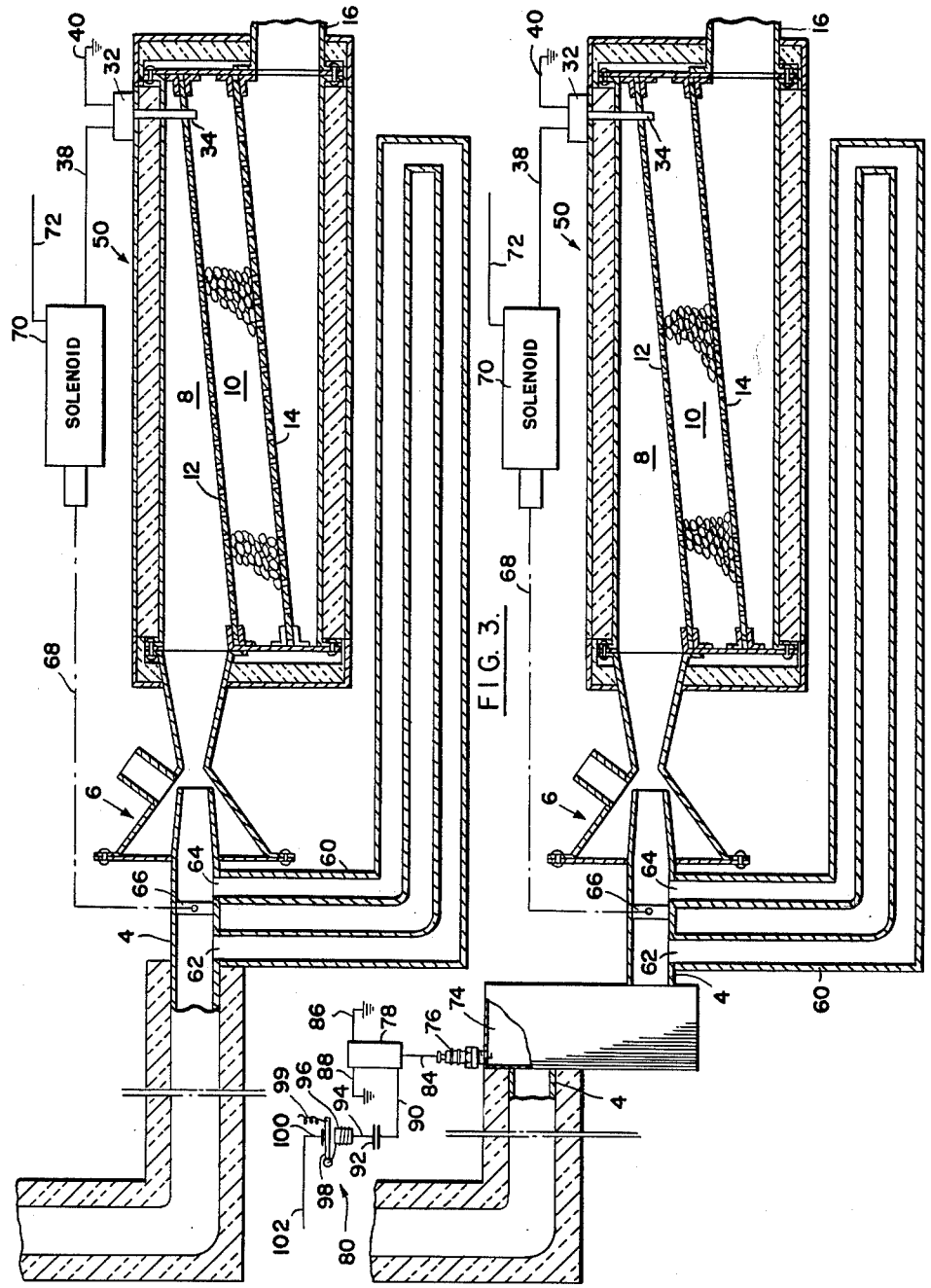
INVENTOR.
WILLARD R. CALVERT
BY
ATTORNEYS … # 3,168,806
APPARATUS FOR IMPROVING THE PURIFICATION OF EXHAUST GASES FROM AN INTERNAL COMBUSTION ENGINE
Willard R. Calvert, Ridley Park, Pa., assignor to Oxy-Catalyst, Inc., Berwyn, Pa., a corporation of Pennsylvania
Filed May 3, 1962, Ser. No. 192,112
3 Claims. (Cl. 60—31)

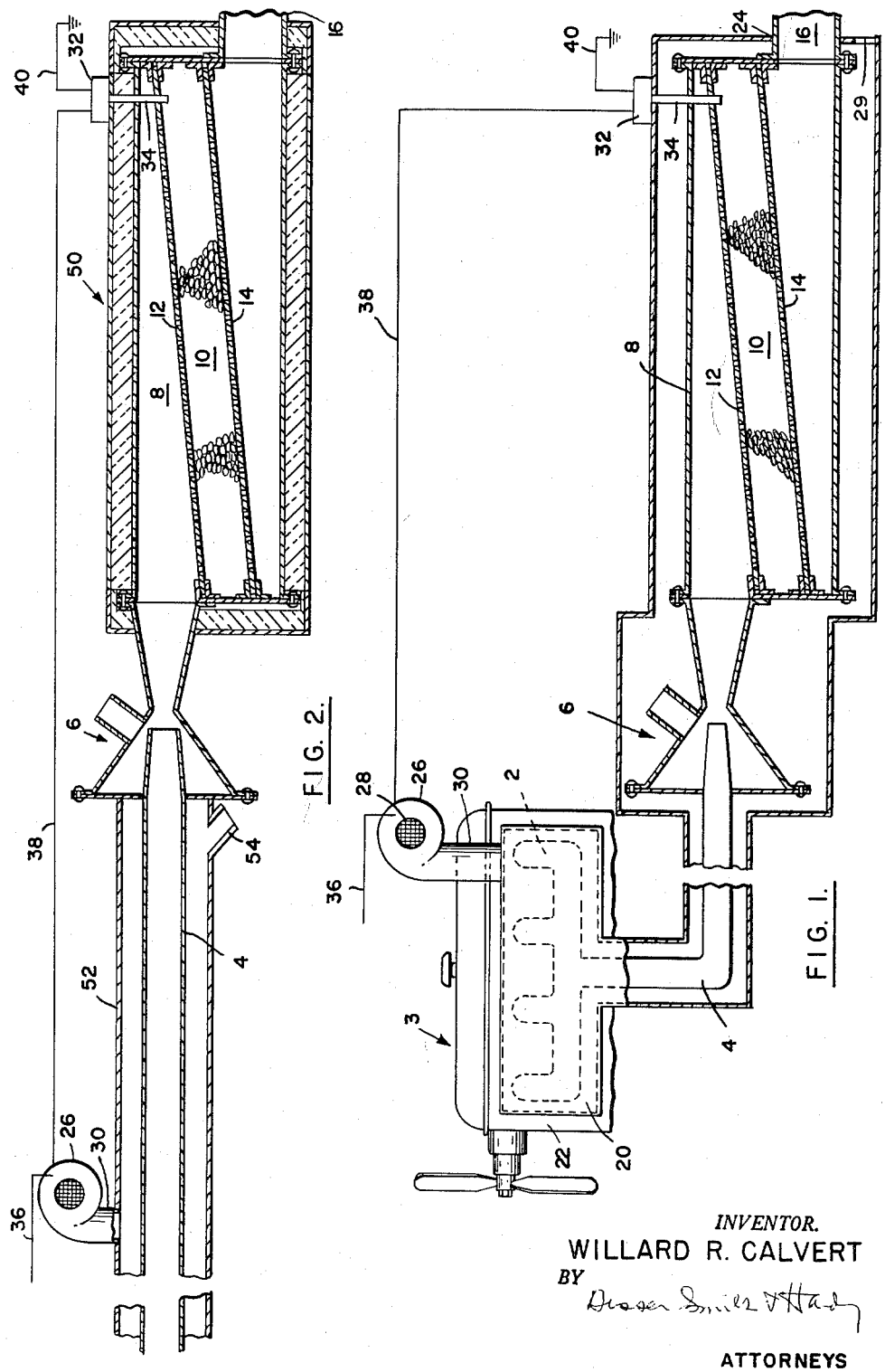

This invention relates to an improvement in method and apparatus for the purification of exhaust gases from an internal combustion engine and more particularly relates to such an improvement employed with a catalytic exhaust purifier generally on an automobile.

It is well known to employ an exhaust purifier containing an oxidation catalyst to purify exhaust gases from internal combustion engines operating on gasoline, generally leaded gasoline, to oxidize the oxidizable constituents of the exhaust gases and thus purify such gases. The oxidation catalyst is brought up to its operating temperature by the sensible heat of the exhaust gases which are discharged through the engine exhaust valves at an elevated temperature and are cooled in the exhaust system prior to reaching the exhaust purifier. While such catalytic exhaust purifiers have been very markedly improved in recent years, they are somewhat deficient under adverse circumstances with respect to bringing the catalyst up to its operating temperature from a cold start.

Even after the catalyst has been brought up to its operating temperature, normally from 800° F. to 1400° F., it may then drop below the satisfactory operating range due to adverse conditions when the interrelationship of the heat supplied to the catalyst bed by the exhaust gases and the heat loss from the catalyst is relatively unfavorable. Such adverse conditions occur, for example, when the heat loss from the exhaust system is markedly increased by adverse driving conditions such as occur when driving an automobile through heavy water or slush or when the condition of the exhaust gases delivered by the engine, such as at idling, are unfavorable to maintaining the operating temperature of the catalyst.

It is, therefore, an object of this invention to provide a method and apparatus whereby the catalyst in an exhaust purifier can be rapidly brought up to a temperature in its operating temperature range without driving the temperature of the catalyst above its operating range and whereby the temperature of the catalyst bed can be promptly brought back to its operating temperature range when, during operation, it falls below this range.

This and other objects of the invention will be made fully apparent from the following description.

The method of this invention comprises insulating all or a portion of the exhaust system connected to the engine block to substantially reduce the heat loss in the system by radiation and convection during the period when the temperature of the catalyst bed in the exhaust purifier is below its operating range which preferably is in the range of from about 800° F. to about 1500° F. In accordance with the method, when the temperature of the catalyst bed is raised to a predetermined temperature within its operating range by the sensible heat in the exhaust gases and by the oxidation reaction if it is desired to carry the temperature above the minimum temperature in the operative range, the exhaust gases flowing in the exhaust system between the engine block and the exhaust purifier are cooled preferably to a temperature in the range of from about 400 to about 800° F. If after initiation of operation in this manner, the temperature of the catalyst bed drops below a predetermined minimum temperature, for example 800° F., then cooling of the exhaust gases is stopped and the exhaust system is insulated as in the case of initiating start-up.

The method and apparatus of the invention will be clarified by reference to the following description read in conjunction with the drawings in which:

FIGURE 1 is a schematic view of an exhaust system in accordance with the invention;

FIGURE 2 is a schematic view of an alternative embodiment of an exhaust system in accordance with the invention;

FIGURE 3 is a schematic view of an additional alternative embodiment of an exhaust system in accordance with the invention; and FIGURE 4 is a schematic view of a still further alternative embodiment of an exhaust system in accordance with the invention.

The well-known conventional parts of an internal combustion engine exhaust system incorporating a catalytic exhaust gas purifier are shown in FIGURE 1. The exhaust system comprises an exhaust manifold 2 connected to an engine indicated at 3 and discharging into an exhaust pipe 4. Exhaust pipe 4 discharges into an air inspirator 6 which in turn discharges into an exhaust purifier 8 having a sloping oxidation catalyst pellet bed 10 confined between grids 12 and 14. Exhaust purifier 8 discharges into exhaust tail pipe 16. The catalyst pellets may be by way of example, a pellet of an activated metal oxide, preferably activated alumina, beryllia, thoria, magnesia or zirconia impregnated with metals or metal oxides having oxidation activity such as platinum, palladium, ruthenium, rhodium, copper, silver, chromium, vanadium, manganese iron or mixtures thereof such as copper and chromium oxides.

Catalytic exhaust purifiers are described in a number of issued U.S. patents, for example, Houdry Patent No. 2,828,189 issued March 25, 1958; Houdry Patent No. 2,776,875 issued January 8, 1957 and in Karol et al. Patent No. 2,853,367 issued September 23, 1958. The sloping bed exhaust purifier described above is disclosed in Eugene J. Houdry pending patent application Serial No. 836,178, filed August 26, 1959, now abandoned. Thus to the extent described above, the exhaust system including a catalytic exhaust purifier is not novel.

The improvement of this invention will now be described with further reference, first to FIGURE 1. An airtight casing 20 of, for example, aluminum or steel, or of a synthetic resin such as, for example, a phenol-formaldehyde resin, surrounds exhaust purifier 8, air inspirator 6, exhaust pipe 4 and manifold 2. Casing 20 fits tightly against block 22 of engine 3 to which it is secured as, for example, by welding if of metal or by flanging with a suitable gasket if of synthetic resin. Casing 20 has an opening 24 to permit the passage therethrough of tail pipe 16.

A centrifugal electric blower 26 having a screened intake opening 28 discharges into a conduit 30 which in turn discharges into the interior of casing 20. Air supplied to the interior casing 20 by blower 26 is exhausted from an opening 29 in casing 20 below tail pipe 16. The operation of blower 26 is controlled by a thermal switch 32 having a sensing element 34 extending into the top of catalyst bed 10, the thermal switch being set to close and commence the operation of blower 26 when the temperature of catalyst bed 10 reaches a predetermined minimum temperature. Power line 36 which may be connected to the battery used to operate the engine is connected to blower 26 which is also connected to line 38 leading to switch 32 which is connected to ground through line 40.

Operation

When engine 3 is first started after a substantial period of non-operation, catalyst bed 10 will be at ambient temperature and hence thermal switch 32 will be in the off position and blower 26 not running. Casing 20 will reduce markedly heat losses in the exhaust system preventing a flow of air over the various parts of the exhaust system, protecting the exhaust system from contact by moisture, snow or slush or the like and reducing losses from the exhaust system due to radiation. In addition, by causing the air available to air inspirator 6 to flow from opening 29 within the confines of casing 20 until it reaches air inspirator 6, the air introduced into the exhaust system is warmed somewhat and hence reduces the cooling effect of this air.

The reduction in heat loss due to the employment of casing 20 and the warming of the air introduced into inspirator 6 results in the transfer of heat from the exhaust gases to the catalyst bed at a markedly increased rate over that achieved in conventional heretofore known systems. This in turn, of course, results in bringing the catalyst bed up to its operating temperature range at a substantially increased rate.

After the temperature of the catalyst bed reaches a predetermined temperature within its operating range, for example 900° F., thermal switch 32 is operated to close and commence the operation of blower 26. Blower 26 by circulating air through the interior of casing 20 causes the exhaust gases to be cooled as they flow through the exhaust system to the exhaust purifier and to be further cooled by the supply of cooler air to air inspirator 6. This cooling of the exhaust gases tends to stabilize the temperature of the catalyst bed within its operating range of, for example from 800 to 1500° F., when taken together with the increased heat loss from the exhaust purifier itself due to the circulation of the air over the exhaust purifier.

When the temperature of the catalyst bed drops below a predetermined minimum temperature due, for example, to a change to unfavorable operating conditions such as idling, thermal switch 32 will open and the operation of blower 26 will thereby stop to return the exhaust system to its insulated low heat transfer condition to bring the temperature of the catalyst bed up to the desired predetermined temperature in the operating range by heat exchange between the exhaust gases and the bed.

*Alternative embodiments*

Referring now to FIGURE 2, an alternative embodiment is disclosed for employment where it is not practical to insulate the entire exhaust system from the engine block through the exhaust purifier. In the embodiment of FIGURE 2, the exhaust pipe 4, air inspirator 6, exhaust purifier 8 and tail pipe 16 are identical with those described in FIGURE 1. Exhaust purifier 8 is surrounded by an insulating casing 50 to reduce heat losses from the purifier. A portion of exhaust pipe 4 preferably from a point closely adjacent to the exhaust manifold down to air inspirator 6 is encased in a casing 52 which is air-tight with the exceptions to be described. In this embodiment, conduit 30 from blower 26 discharges into the interior of casing 52 which is provided with an exhaust opening indicated at 54. Here again, blower 26 is controlled by thermal switch 32 in the same manner as described in the embodiment of FIGURE 1.

The operation of the embodiment of FIGURE 2 will be substantially the same as the embodiment of FIGURE 1 with blower 26 being in operation when the catalyst bed of the exhaust purifier is above a predetermined temperature. It will be evident that the embodiment of FIGURE 2 will be somewhat less efficient with respect to expediting bringing the catalyst bed up to its operating temperature due to the fact that less of the pertinent parts of the exhaust system are insulated against heat loss. It will further be evident that this embodiment is less effective in controlling the temperature of the catalyst bed since the permanent insulation of the exhaust purifier 8 by casing 50 eliminates any variation in the heat loss from the catalyst bed. In any event, while somewhat less efficient than the embodiment of FIGURE 1, the embodiment of FIGURE 2 works a substantial improvement in bringing the exhaust purifier into operation promptly from a cold start and in maintaining the catalyst bed temperature within its operating range.

A still further embodiment is disclosed in FIGURE 3 where exhaust pipe 4, air inspirator 6, exhaust purifier 8, insulating casing 50, tail pipe 16 and thermal switch 32 are all as previously described above. In this embodiment exhaust pipe 4 is surrounded by insulating material such as asbestos from the exhaust manifold 2 down to a point adjacent air inspirator 6. An uninsulated conduit 60 extends from opening 62 in exhaust pipe 4 through an extended path preferably of from about 24 to 180 inches to opening 64 in exhaust pipe 4. A butterfly valve 66 in the position shown in FIGURE 3 blocks exhaust pipe 4 causing the exhaust gases to flow through opening 62, conduit 60 and back into exhaust pipe through opening 64 downstream of valve 66. Valve 66 is operated by a linkage indicated schematically at 68 which in turn is operated by solenoid 70 which is connected to power line 72 and to thermal switch 32 through line 38.

The operation of the embodiment of FIGURE 3 is very similar to that of the embodiment of the previously described figures. During initial start-up, the bed then being cold, switch 32 is in the off position and the solenoid is deenergized placing butterfly valve 66 in the open position as contrasted to the closed position in which it is shown in FIGURE 3, thus causing the exhaust gases to go directly into air inspirator 6 by-passing conduit 60. The insulation about exhaust pipe 4 reduces the heat loss of the exhaust gases as they travel from the manifold to the air inspirator and thus provides for the delivery of heat from the exhaust gases at a greater rate to the catalyst bed 10 to expedite its being warmed to its operating temperature range. When bed 10 reaches a pre-determined operating temperature, switch 32 is closed to actuate solenoid 70 and place valve 66 in the closed position through linkage 68. This causes the exhaust gases to be by-passed through uninsulated conduit 60 with the resultant cooling down of the exhaust gases before they re-enter exhaust pipe 4 through opening 64 downstream of valve 66. The system continues to operate in this condition until the temperature of the catalyst bed 10 drops below the predetermined operating temperature causing switch 32 to open and solenoid 70 to place butterfly valve 66 back in the open position.

The embodiment of FIGURE 4 is identical with the embodiment of FIGURE 3 with the exception that a combustion chamber 74 is interposed in exhaust pipe 4. Combustion chamber 74 is provided with a spark plug 76 which is operated by means of a coil 78 and a circuit interrupter 80. The secondary winding (not shown) of coil 78 is connected to spark plug 76 by line 84 and to ground by line 86. The primary coil (not shown) is connected to ground by line 88 and is connected to line 90 connected to a condenser 92 which in turn is connected to a line 94, part of which is coiled around a magnetizable coil 96 and then connected to magnetizable pivoted switch arm 98. Switch arm 98 is biased by a spring 99 against contact 100 which is connected to a power line 102 which can be connected to the battery used to operate the engine.

The operation of the embodiment of FIGURE 4 is the same as the operation of the embodiment of FIGURE 3 with the exception that a spark is continually supplied to combustion chamber 74 by spark plug 76 such that combustible mixtures of gasoline and air and high concentrations of CO are combusted in combustion chamber 74 thus decreasing the work load of the exhaust purifier 8 and preventing overheating of the catalyst bed 10 by having too high a concentration of oxidizable constituents in the exhaust gases. Such a condition occurs, for example, particularly on rapid deceleration from a relatively high speed to a relatively low speed. While, of course, the combustion in chamber 74 produces heat, a substantial amount of the heat will be dissipated during normal operation of the exhaust purifier as the products of combustion pass through conduit 60.

What is claimed is:

1. In combination with an internal combustion engine having an exhaust system including a catalytic exhaust purifier having a catalyst bed and connected to the engine by an exhaust pipe and a manifold and means to supply air to the exhaust gases upstream of the exhaust purifier, the improvement comprising a casing surrounding and spaced from at least a portion of the exhaust system to insulate said portion during the heating up of the catalyst bed by the sensible heat of the exhaust gases from the engine and means responsive to a predetermined minimum temperature of the catalyst bed to circulate cooling air between said casing and said portion of the exhaust system.

2. The combination of claim 1 characterized in that said casing surrounds the exhaust purifier, the exhaust pipe, the manifold and the air supply means.

3. The combination of claim 1 characterized in that the means to circulate air includes a blower.

References Cited in the file of this patent

UNITED STATES PATENTS

| | | |
|---|---|---|
| 2,174,626 | Fogas | Oct. 3, 1939 |
| 2,378,083 | Hull | June 12, 1945 |
| 2,795,103 | Jenison | June 11, 1957 |
| 2,898,202 | Houdry et al. | Aug. 4, 1959 |
| 2,956,865 | Williams | Oct. 18, 1960 |
| 2,947,600 | Clayton | Aug. 2, 1960 |
| 2,991,160 | Claussen | July 4, 1961 |
| 3,050,935 | Eastwood | Aug. 28, 1962 |

FOREIGN PATENTS

| | | |
|---|---|---|
| 262,181 | Great Britain | Dec. 3, 1926 |